United States Patent [19]

Ota et al.

[11] Patent Number: 4,580,450
[45] Date of Patent: Apr. 8, 1986

[54] VALVE WITH A LEVEL GAUGE FOR A LIQUEFIED CARBON DIOXIDE CONTAINER

[75] Inventors: Shiro Ota, Amagasakishi; Jiro Nitta, Itamishi; Teruo Hatori, Akashishi; Hajime Miyoshi, Takatsukishi; Akira Oi, Osakashi, all of Japan

[73] Assignee: Kabushiki Kaisha Neriki, Hyogoken, Japan

[21] Appl. No.: 735,094

[22] Filed: May 17, 1985

[30] Foreign Application Priority Data

Jul. 6, 1984 [JP] Japan .......................... 59-102782[U]

[51] Int. Cl.$^4$ ............................................. G01F 23/36
[52] U.S. Cl. .................... 73/313; 73/DIG. 5
[58] Field of Search ................ 73/308, 311, 313, 319, 73/322, DIG. 5; 137/558, 590, 210; 251/144

[56] References Cited

U.S. PATENT DOCUMENTS

| | | | |
|---|---|---|---|
| 1,143,344 | 6/1915 | Yarnall | 73/322 |
| 2,029,405 | 2/1936 | Beadle | 137/558 |
| 2,634,608 | 4/1953 | Sorber | 73/DIG. 5 |
| 2,802,362 | 8/1957 | Lyon | 73/322 |
| 3,397,577 | 8/1968 | Siebert | 73/322 |
| 4,139,750 | 2/1979 | Rau | 73/313 |

Primary Examiner—Samuel Scott
Assistant Examiner—Noah Kamen
Attorney, Agent, or Firm—Schwartz, Jeffery, Schwaab, Mack, Blumenthal & Evans

[57] ABSTRACT

The invention relates to a valve with a level gauge for a elongated liquidfied carbon dioxide container, comprising a body, and a level gauge having at least one articulating or flexible part between a float and a rod connected on the float to move an indicating member by a detecting member fixed thereon. The flexible part allows the float to contact the inner periphery of the container, wherein the inner periphery of the container shares a part of the weight of the float, cancelling the bending moment which is produced by the weight of the float and acting on the rod.

15 Claims, 18 Drawing Figures

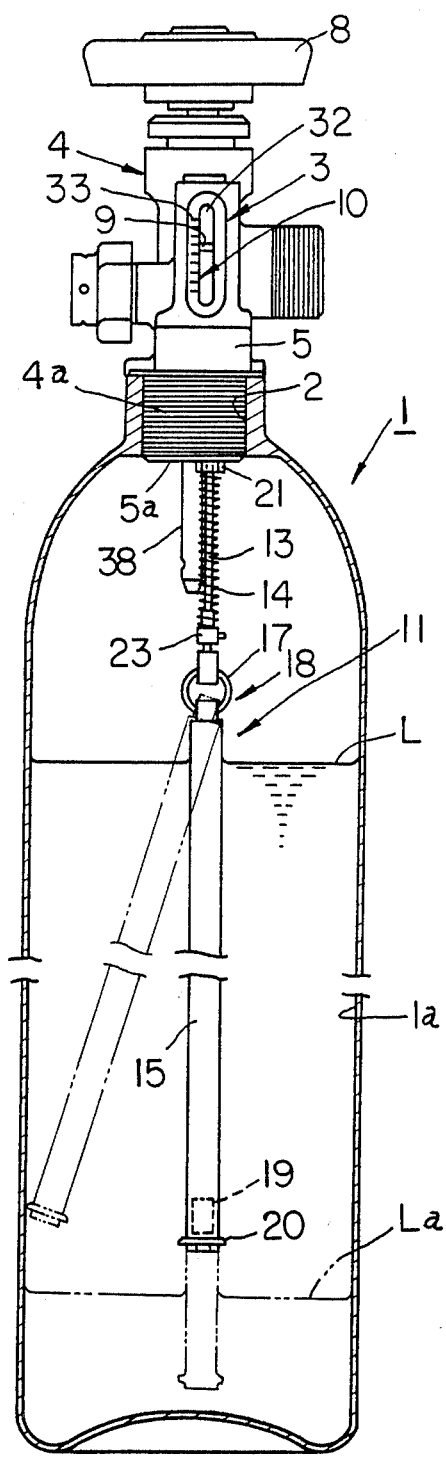

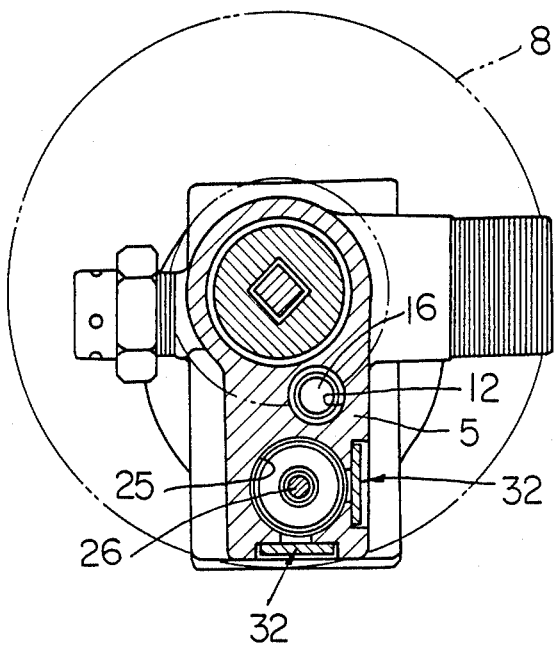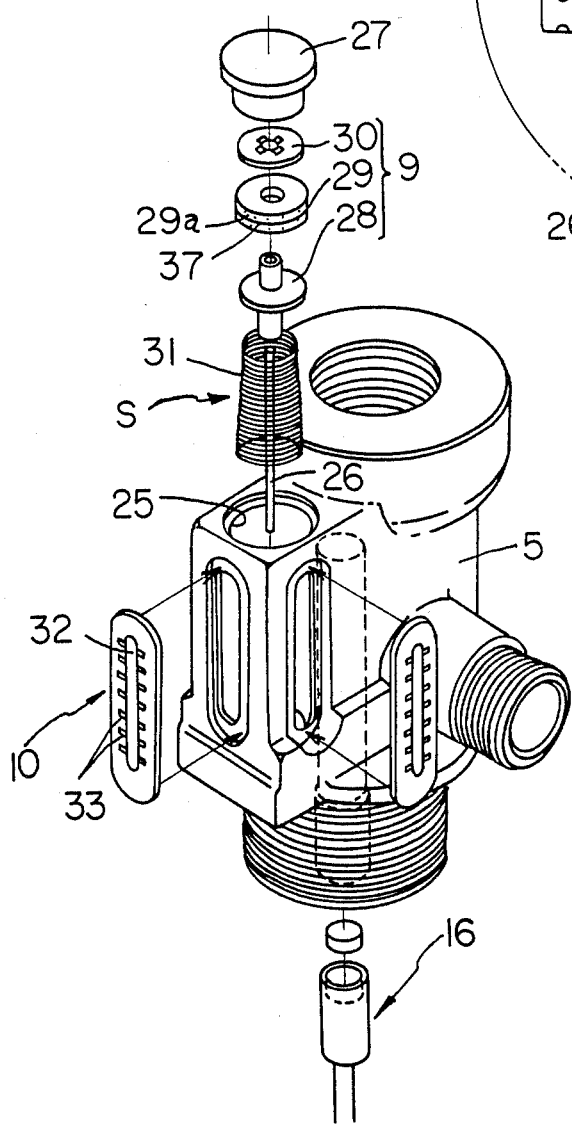

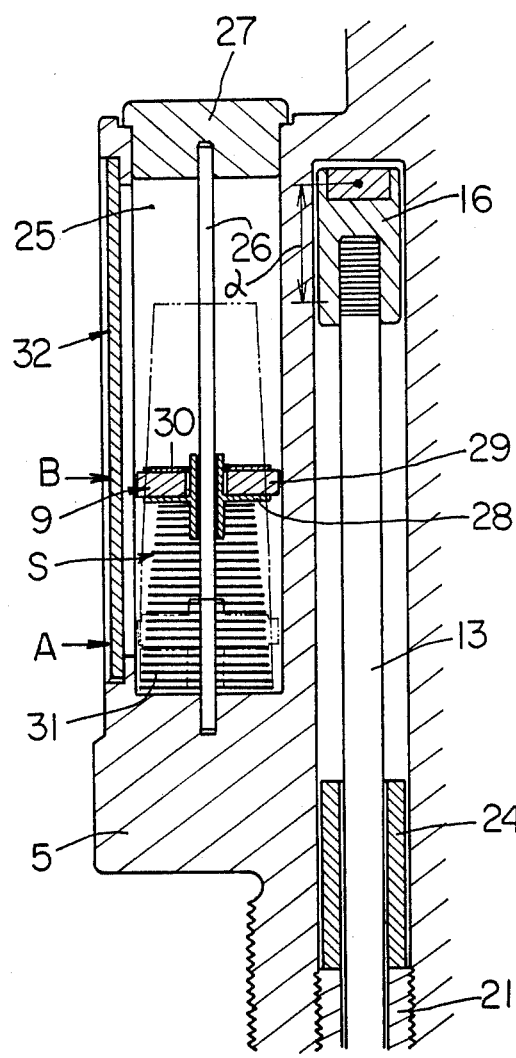
Fig. 5
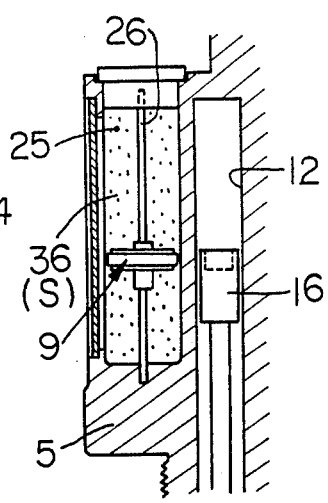
Fig. 6
Fig. 7

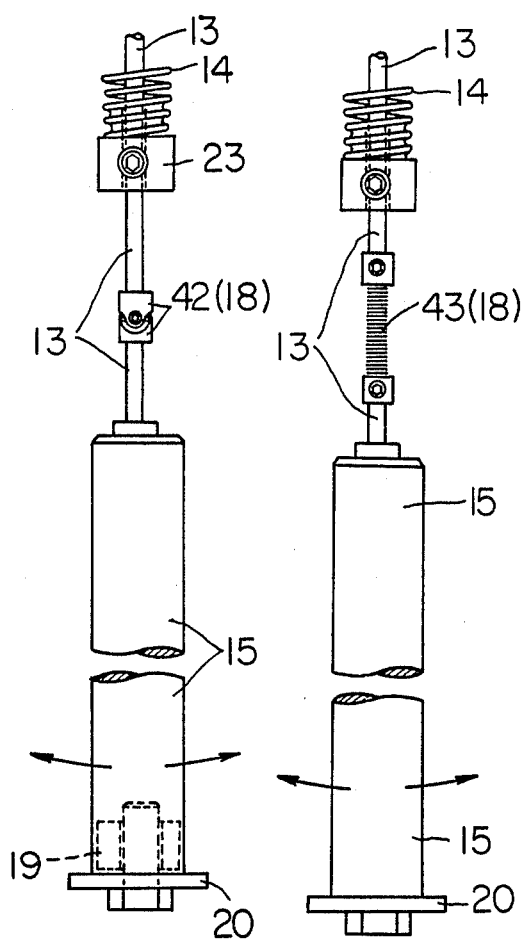
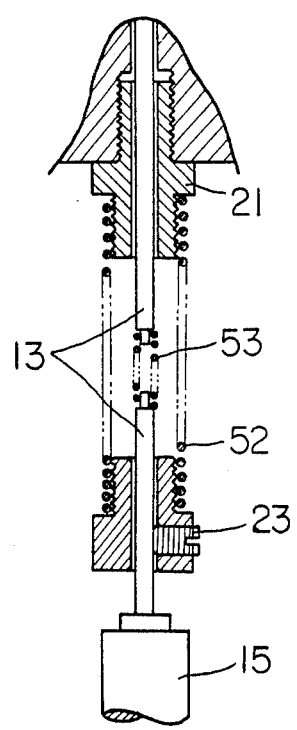

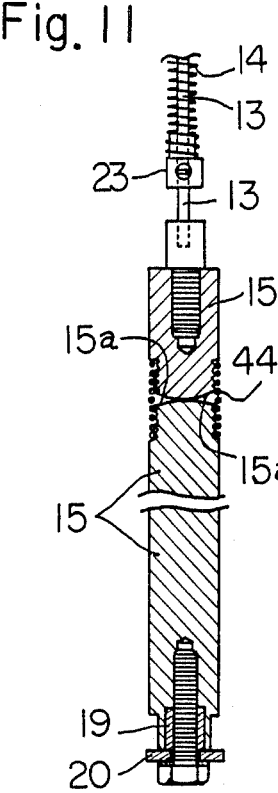
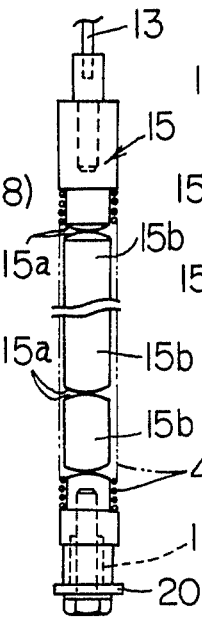
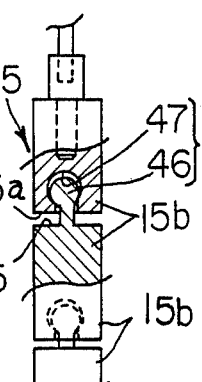
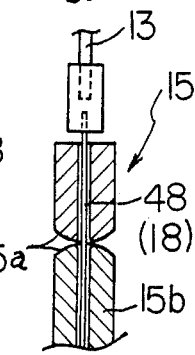
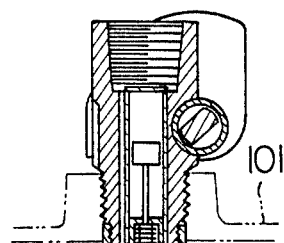
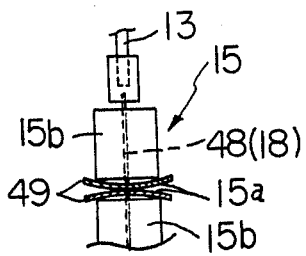
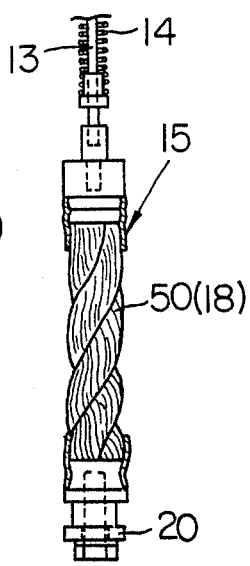
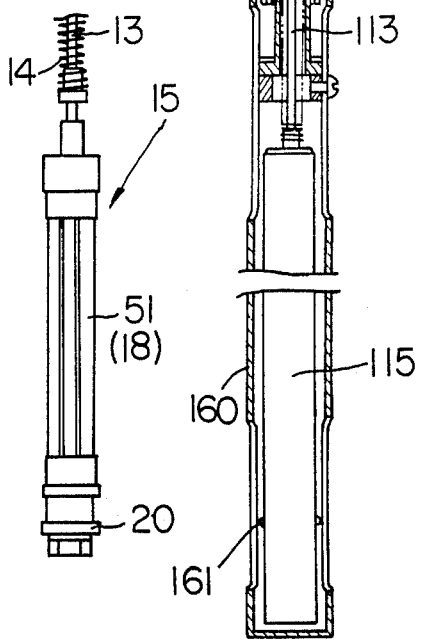

VALVE WITH A LEVEL GAUGE FOR A LIQUEFIED CARBON DIOXIDE CONTAINER

BACKGROUND OF THE INVENTION

1. Field of the Invention

The present invention relates to a valve with a level gauge for a liquefied carbon dioxide container.

2. Related art statement

A container for containing liquefied carbon dioxide is a cylindrical high pressure container. Such containers are usually much more slender than the wide containers used for liquefied petroleum gas which are generally used in the home and so on, as seen in the market.

Slender containers such as liquefied carbon dioxide containers are different from liquefied petroleum gas containers in the fact that they are often handled very roughly in the transportation. For example, they are roughly tilted or laid down and rolled over and over.

Therefore, the valve with a level gauge assembled in such container is especially desired to endure such rough handling, to be free from the damages and to keep its accurate performance.

The usual valve of this kind adopted to a liquefied petroleum gas container comprises, as disclosed in U.S. Pat. No. 2,634,608, and shown in FIG. 18 in the present application, a body being adapted to be screwed in a threaded hole formed at an upper end of the cylindrical container 101, and a level gauge combined with the body. Such level gauge comprises an indicating member inserted in said body and adapted to move up and down, a rod 113 having upper and lower parts, said upper part is inserted in said body and is adapted to slide up and down, and said lower part is extruded into said container 101, a detecting member fixed to the upper end of said rod 113 so as to move said indicating member by magnetic attraction therebetween, and a vertically elongated rigid float 115, inserted in said container 101 adapted to move up and down freely, and connected rigidly to the lower end of said rod 113 at the upper end thereof.

When said container 101 is tilted or laid down, as said float 115 is hung at its one end by said rod 113, the weight of said float 115 is fully supported by said rod 113. Said rod 113 is made so slender that said rod 113 is very easily and permanently bent by the weight of said float 115, and that the accurate performance of the level gauge is easily lost thereafter.

In order to prevent such bending of the rod 113, an improved valve disclosed in U.S. Pat. No. 2,634,608, and shown in FIG. 18 in the present application, comprises a cylndrical casing 160 additionally.

The inner periphery of said casing 160 limits the range where said float 115 is movable and the deflection of said rod 113 does not exceed the range of elastic deflection. Thus, said rod 113 is prevented from its permanent deformation.

However, the liquid level gauge of this kind implies following problems when it is adopted to such container containing liquefied carbon dioxide:

(a) It is necessary to protect said rod 113 and said cylindrical float 115 by said tubular casing 160 surrounding them in order to prevent the rod 113 from permanent bending caused by the weight of the float 115 acting thereon when the container is tilted or laid down. However, as said casing 160 is also hung at one end by said body, it may be deflected by the weight of itself, too. And it is necessary to restrained the deflection of said casing within the range where the deflection of the rod 115 does not exceed the range of elastic deflection. To this end, the radial sizes of said casing 160, and consequently these of said level gauge, are made large. As the result this usual valve is not suitable for slender containers such as liquefied carbon dioxide containers.

(b) Moreover, as the casing 160 is made axially long to cover around the long float 115, it is necessary to provide such slider 161 consisted with balls or projections between the peripheries of the float 115 and the casing 160 in order to make the sliding motion of the rod 113 and the float 115 smoother in the casing 160 with decreased resistance. Therefore, the level gauge is made complex and expensive.

(c) Further more, even if the rod 113 and the float 115 were housed in the casing 160 for protection of them, in the case of the slender container such as that for containing liquefied carbon dioxide, that may be roughly tilted or laid down and rolled over and over in transportation, it is possible that the casing 160 itself is deflected and collides with the inner periphery of said container 101, and is broken by the collision with the wall of container.

As the result, the usual level gauge disclosed above is unsuitable for liquefied carbon dioxide containers which are handled very roughly.

SUMMARY OF THE INVENTION

Therefore, the first object of the present invention is to propose a suitable valve with a level gauge for a vertically elongated liquefied carbon dioxide container which is roughly tilted, laid down, and rolled over and over very often in the handling.

The second object of the present invention is to propose a valve with a level gauge for liquefied carbon dioxide which has an excellent durability and sure performance, while its structure is very simple.

The third object of the present invention is to make a valve with a level gauge for a liquefied carbon dioxide container as inexpensive as possible by using a simple articulating or flexible joint, or by using a float made of flexible materials.

The fourth object of the present invention is to propose a valve with a level gauge for a liquefied carbon dioxide container which level gauge is ensured of its normal performance by a preventive means for preventing it from misactuation.

To those ends, a valve with a level gauge for a liquefied carbon dioxide container according to the present invention, comprises a body being adapted to be screwed in a threaded hole formed at an upper end of a vertically long cylindrical container for containing liquefied carbon dioxide. The devices also comprises a level gauge, wherein said level gauge comprises an indicator visible from outside of said body, a rod having an upper and a lower part of the rod, said upper part is inserted in said body so that it can slide up and down, and said lower part is extruded into said container, a detecting member is fixed to said upper part of said rod so as to drive the indicator by magnetic power therebetween, and a vertically elongated float is inserted in said container and is adapted to move up and down. The float is connected to said lower part of said rod, and at least one articulating or flexible part is disposed on the way of said float and/or lower part of said rod so as to contact said float with the inner periphery of said container at least at the lower end thereof thereby sharing a part of the weight of said float to said container, and cancelling the bending moment acting on said rod caused by the weight of said float, when said container is tilted or laid down.

When said container was tilted or laid down, said articulating or flexible part is articulated or deflected thereat, and at least said lower end of said float is received on said inner periphery of said container, and a part of weight of said float is born by said inner periphery. The weight of said float acting on said rod is outstandingly decreased when said container is tilted or laid down. Moreover the bending moment caused by the weight of said float and acting to said rod is cancelled by the articulation or deflection at said articulating or flexible part. As the result, said rod is prevented from permanemt bending and damages.

As soon as said container is stood up vertically, said float will be aligned with said rod vertically by the gravitation and the normal performance of said level gauge is recovered.

Said articulating or flexible part may be positioned betwen said rod and said floating column, on the way of said rod or said float.

One may employ a plurality of said articulating or flexible parts. For example, a plurality of articulating or flexible parts may be disposed on the way of float along the length.

Said articulated or flexible part may be comprised of a ring articulated with the lower end of said rod, and with the upper end of said floating column advantageously.

Said articulated or flexible part may be comprised of an articulating joint such as universal joint, knuckle joint, or a flexible joint such as spring joint, wire joint, and so on.

Said articurating or flexible part may be comprised of a float made of flexible materials. In case that said floating column was made of flexible material, said upper end of said float may be rigidly fixed with the lower end of said rod.

Moreover, said float is advantageously provided with a balancing weight at said lower end thereof.

Further more, said float is advantageously provided with a cushion or buffer at the lower end thereof to absorb the shock of contact with said inner periphery of said container, and to prevent said inner periphery of said container and said float from their direct collision and damages caused by such collision.

Said indicator driven up and down by said detecting member may be advantageously provided with an indicating member driven by said detecting member to present the rest amount of the liquefied carbon dioxide in said container, and preventive means for preventing it from misactuation. Such preventive means may be comprised of biasing means such as a spring which is biasing said indicating member to the following range, where the indicating member is able to be adjusted its position to the correct position corresponding to any position of said detecting member by magnetic attraction acting therebetween.

The inlet port of said valve for filling liquefied carbon dioxide in said container is advantageously opened against the side wall of said container conrtary to said rod, so as to eliminate influence of filling pressure which is sufficiently high to bend said rod.

BRIEF DESCRIPTION OF THE DRAWINGS

The invention will be clarified and understood more precisely by reading detailed description of preferred embodiments described below referring with annexed drawings.

In the drawings:

FIG. 2 is a side elevation of the first preferred embodiment of the present invention.

FIG. 3 is a cross section along a line III—III in FIG. 1.

FIG. 4 is a perspective view of a dissemble level gauge according to the first preferred embodiment of the present invention.

FIG. 5 is a partially sectioned front elevation view of a level gauge according to the first preferred embodiment of the present invention.

FIG. 6 is a sectioned front elevation view of the invention incorporating a modified preventive means;

FIG. 7 is a front elevation view of the invention illustrating a second modified preventive means;

FIG. 8 is a front elevation view of the invention illustrating a modified articulating part comprising a universal joint;

FIG. 9 is a front elevational view of the invention illustrating a modified articulating part comprising a spring joint;

FIG. 10 is a front elevational view of the invention illustrating a modified articulating part comprising two double springs;

FIG. 11 is a front elevational view of the invention illustrating a modified articulating part comprising a spring connected to a float;

FIG. 13 is a front elevational view of the invention wherein the floating column is divided into a plurality of pieces which are articulated by knuckle joints;

FIG. 14 is a front elevational view of another embodiment of the invention wherein the float is divided into two pieces which are joined by a flexible wire;

FIG. 15 is a front elevational view of the invention wherein the surfaces of the float are formed on a diskette;

FIG. 16 is a front elevational view of the invention wherein the flexible part is comprised of elongated flexible material;

FIG. 17 is a front elevational view of the invention wherein the flexible part is comprised of a plurality of blended plastic bars; and FIG. 18 is a sectioned side elevation of the usual level gauge assembled with liqified petroleum gas container.

DETAILED DESCRIPTION OF PREFERRED EMBODIMENTS

Figure 1:
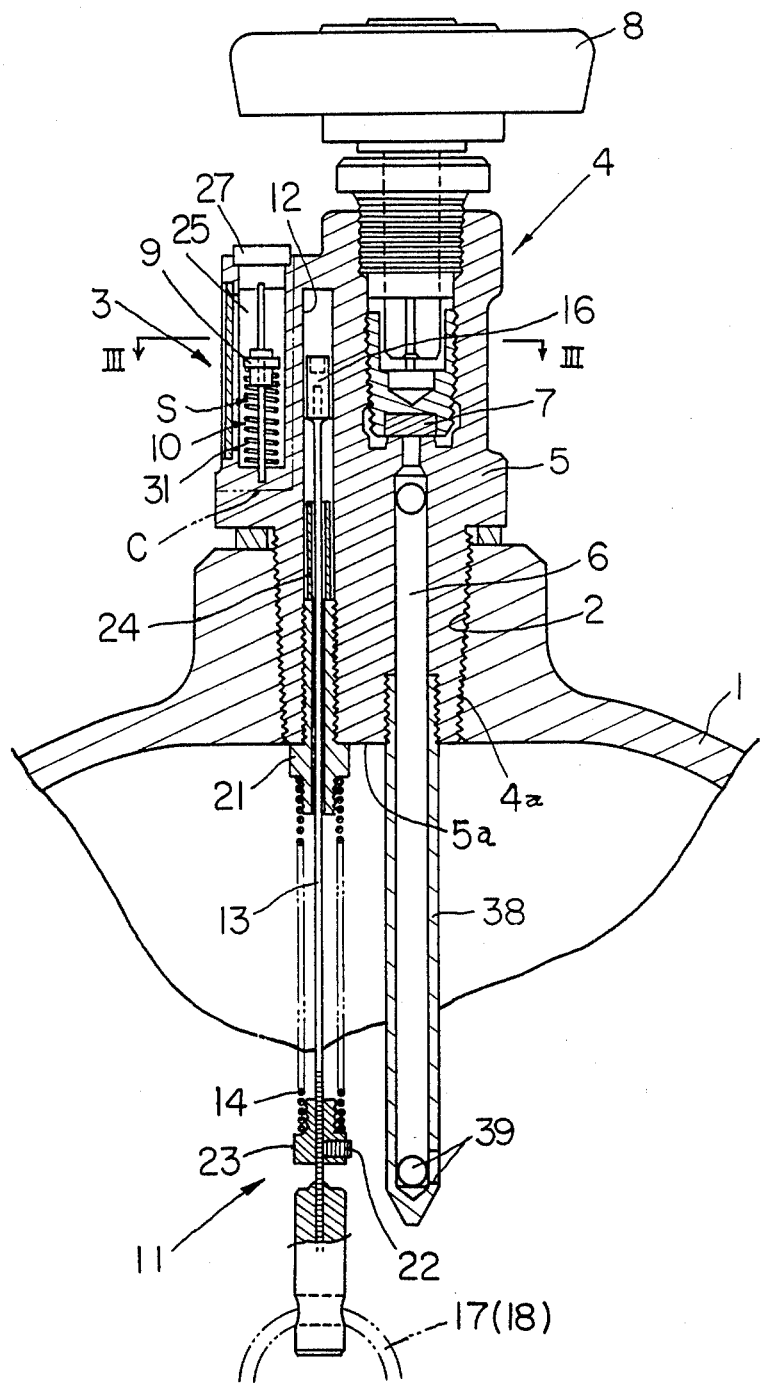
FIG. 1 is a sectioned front elevation of a level gauge according to the first preferred embodiment of the present invention.

Now, referring to FIGS. 1 to 5, a container 1 for containing carbon dioxide liquefied under high pressure is comprised of a vertically elongated seamless container of a known type. The container 1 having a mouth block at the top thereof is provided with a vertical through hole 2 at the mouth block. The inner periphery of the hole 2 is threaded so as to screw a high pressure valve 4 combined with a level gauge 3 therein tightly.

The body 5 of the valve 4 is made of non-magnetic materials such as brass, having a gas passage 6 for taking out carbon dioxide gas, and a valve member 7 for shutting off the passage 6 on the way thereof, as shown in FIG. 1. The valve 4 is arranged to take out the gas from inside of the container 1 through the passage 6 opened by moving the valve member 7 with a handle 8 as usual. The level gauge 3 for indicating the rest amount of carbon dioxide contained in the container 1 is assembled in the body 5 at the lateral side of the valve member 7. The manner of these arrangement is taught by U.S. Pat. No. 2,634,608 mentioned above.

The level gauge 3 comprises an indicator 10 having an indicating member 9 which indicates the rest amount of liquefied carbon dioxide in the container by the vertical position thereof, and means for operation 11 which drives the indicating member 9 up and down. As seen in FIGS. 1 and 2, the means for operation 11 involves a vertical blind hole 12 drilled in the body 5 near to the indicator 10 from the bottom 5a to the upper part near the top of the body 5, a rod 13 having an upper and a lower part, which upper part is inserted in the hole 12 freely slidable up and down in the hole 12, and the lower part extends in the container, a detecting member 16 made of a magnet and fixed on the upper end of the rod 13. The rod 13 is biased by a spring 14 upwardly. A rigid cylindrical float 15 shown in FIG. 2 formed long vertically is suspended in the container 1 under the rod 13.

One of the distinguished features of the present invention is that the rigid float 15 is articulated to the lower end of the rod 13 at the upper end thereof by an articulating or flexible part 18 consisting of only one ring 17.

If the rigid floating column 15 was fixed rigidly with the rod 13 as well as that adopted in a container for containing liquified petroleum gas, the rod 13 will be permanently bent by the weight of the float 15 when the container 1 is tilted or laid down in handling, such as transportation, and the level gauge 3 will not be able to function accurately thereafter.

However, according to the invention, an articulating or flexible part 18 is provided between the rod 13 and the float 15. When the container 1 is tilted or laid down, the float 15 is articulated or bent and is restorable at the joined end, that is, at the articulating or flexible part 18, and the lower end of the float 15 which is extending to near the bottom of the container 1 may be received by the inner periphery of the side wall 1a near the bottom, as shown by an imaginary line in FIG. 2, so that the weight of the float 15 received by the rod 13 is largely decreased and the permanent bending or damages of the rod 13 is eliminated. And as soon as the container 1 is stood up vertically, the float 15 is aligned with the rod vertically by gravitation, and the rod 13 will be actuated accurately at any time.

The float 15 is advantageously provided with a balancing weight 19 at the lower end or near there of the float 15. And a cushion 20 made of rubber is adapted to wrap the lower part of the outer periphery of the balancing weight 19, so as to prevent the sounding of the container 1 by such collision, and damage of the inner periphery of the container 1 and the float 15. The upper end of the spring 14 suspending the float 15 is fixed to the metal fittings 21 which are screwed in the hole 12 at the bottom 5a of the body 5, and through which the rod 13 is penetrates so that it is slidable up and down. The lower end of the spring 14 is fixed to an adjustable fixing member 23 which is screwed adjustably to its vertical position on the screw 22 threaded at the lower part of the rod 13.

In the hole 12, a sleeve 24 is inserted to define the lowest position of the detecting member 16 between the detecting member 16 and metal fittings 21. The sleeve 24 and the metal fittings 21 may be made in one piece.

The indicator 10, as seen in FIG. 4, comprises an indicating member 9, a hole 25 for housing the the member 9 movably up and down therein, drilled down from the top surface of the body 5 and parallel with the vertical blind hole 12, a guide pin 26, around which the indicating member 9 is fitted slidably up and down, stood in the hole 25, and a cap 27 which fixes the top of the pin 26 to the body 5 by its fitting with the body at the opening of the hole 25.

The indicating member 9 is adapted to move up and down following to the detecting member 16 fixed on the upper end of the rod 13. Namely, the indicating member 9 is provided with a slider 28 fitted around the guide pin 26 for making it easy to slide up and down along the pin 26, an annular magnet 29, and a metal seat 30, both fixed on a slider 28 orderly.

Preventive means S for preventing the indicating member 9 from the misactuation is inserted between the lower surface of this indicating member 9 and the bottom of the hole 25 for, biasing the indicating member 9 upward.

The preventive means S is preferably made of a soft compressive spring 31 whose shape at free state is presented by a imaginary line in FIG. 5. The biasing power of the spring 31 is balanced with the weight of the indicating member 9 to elevate it up to higher position B higher than the "empty" position A marked at the lower part of a scale 33 covering a indicating window 32 of the indicator 10 when the indicating member 9 is put on the free spring 31, as seen in FIG. 5.

When a shock is given to the container 1 or the valve 4 at any occasion such as filling or transportation, the indicating member 9 may be dropped down toward the "empty" position A disposed of following range α, where the magnetic attraction between the magnet 29 of the indicating member 9 and the detecting member 16 is effective to adjust the posotion of the former to the correct position corresponding to any position of the latter.

The indicating member 9 dropping toward the "empty" position A is received on the preventive means S comprised of the spring 31 at the higher position B and driven to the position corresponding to the detecting member 16 by the magnetic attraction therebetween, before it will be dropped to the "empty" position A. Thus, the indicating member 9 is able to move to the correct position and to indicate accurately amount of carbon dioxide left in the container 1 at any time.

When the motion of detecting member 16 is so rapid that the indicating member 9 cannot follow it, the indicating member 9 will be dropped down to the "empty" position A out of the following range α, by the gravity. However, as soon as the indicating member 9 was dropped to the "empty" position A, it is elevated by the function of the spring 31 to the following range α without staying at the "empty" position A, so that the indicating member 9 is always able to recover its correct position, following to the detecting member 16 instantly, thus the indication of the rest amount is ensured to be accurate at any time.

A modified preventive means S according to the present invention, as shown in FIG. 6, is provided with a spiral groove 34 formed at the periphery of the guide pin 26, so as to produce proper resistance against the motion of the indicating member 9 between the pin 26 and the hole 35 of the indicating member 9, through which the pin 26 is fitted slidably.

As shown in FIG. 7, another modified preventive means S is comprised of liquid filled in the hole 25, which produces proper fluidity resistance to prevent an instant drop of the indicating member 9 to the bottom of the hole 25 when the member 9 is moved out of the following range α.

The indicating member 9 may be adapted to be combined with the body 5 removably together with other parts surrounding it within the indicator 10 as shown by the imaginary line C in FIG. 1.

Further, the preventive means may be modified to comprise a weak spring (not shown) suspended under the cap 27 to pull up the indicating member 9.

The magnet 29 is provided with a colored indication line 37 at its periphery 29a, so as to detect the amount of liquified carbon dioxide in the container by observing the line 37 through the scale 33 covering the indication window 32 opened at one lateral side of the indicator 10.

A vertical filling pipe 38 having a lower end closed and an filling port 39 near to the lower end is inserted in the container 1 and communicated with the gas passage 6 at the upper end thereof for taking out carbon dioxide gas. The filling port 39 is directed against the side wall 1a of the container opposite the means for operation 11, so as to prevent the rod 13 of the means for operation 11 from bending or damages caused by the spout of liquefied carbon dioxide from the filling port 39.

The rod 13 is positioned at high position in the guide hole 12 by floating power acting to the float 15 when the amount of liquefied carbon dioxide contained in the container 1 is large and the level is as high as that shown by a full line L in FIG. 2.

When the detecting member 16 is elevated up in accordance with the elevation of the rod 13 on which the member 9 is fixed, the magnet 29 of the indicating member 9 attracted to the detecting member 16 by the magnetic attraction thereof is moved up, and the indication line 37, elevated high in the indication window 32, presents that the level in the container 1 is high.

On the contrary, the more liquefied carbon dioxide is fed out of the container 1, the lower the level therein is descended. And the floating power acting to the float 15 is decreased after the level in the container 1 is descended to the position shown by an imaginary line La in FIG. 2, and the rod 13 is pulled down until the tension of the spring 14 and the weight taken from the floating power acting on the float 15 from the weight of the float 15 balance each other.

When the detecting member 16 is descended in accordance with the level in the container, the magnet 29 of the indicating member 9, attracted to the detecting member 16, is moved down and the colored indication line 37 is seen to be descended in the indication window 32, so as to present that the level in the container 1 is low and the rest amount has become small.

It is notable that the float 15 catches not only the floating power produced by the liquid phase of the carbon dioxide in the container, but also the floating power produced by the gaseous phase therein which is generated when the temperature is higher than the critical point of the carbon dioxide. Therefore, it is possible to detect the accurate total rest amount in the container 1 at any desired time, for example, during the feeding, at valve operation to close or open it, and so on.

Of course, one of the detecting member 16 and the magnet 29 of the indicating member 9 may be substituted by magnetic materials such as iron, steel, and so on, instead of magnet.

The articulating or flexible part 18 according to the invention may be modified variously, as seen in FIGS. 8 to 17, for example.

A modified articulating or flexible part 18 shown in FIG. 8 comprises a universal joint 42 with a cross member inserted on the way of the rod 13.

Another modified articulating or flexible part 18 shown in FIG. 9 comprises a spring joint 43 disposed along the rod 12.

Another modified articulating or flexible part shown in FIG. 10 comprises a double springs 52 and 53, both of which may contribute to suspend the float 15 as well as the spring 14 shown in FIGS. 1 and 2.

Further modified articulating or flexible part 18, as seen in FIG. 11, comprises a spring 44 which is connecting upper and lower parts of the float 15. The float 15 is divided into these two parts at the position near the top. The contacting surfaces 15a of these parts for contact with the other part are formed in partial spherical surfaces.

Still further modified articulating or flexible part 18, as seen in FIG. 12, comprises a spring 45 connecting the top and the bottom pieces 15b of the float 15 which is divided into a plurality of pieces 15b along the length, and housing the rest pieces 15b of the float 15 therein. Each contacting surface 15a of these pieces 15b is formed in a partial spherical surface.

It will be easily understood that the spring 45 may be substituted with a cylindrical net in the embodiment described just before.

In the modified embodiment of the invention, shown fragmentary in FIG. 13, the floating column 15 is divided in to a plurality of pieces 15b along the length, and the pieces 15b are articulated one by one with knuckle joints 18, each of which comprises a spherical extrusion 46 projected from one end 15a of each piece 15b and a socket hole 47 concaved in each piece 15b at the other end 15a.

In the other modified embodiment of the invention, shown fragmentary in FIG. 14, the float 15 is divided into two pieces 15b at the position near the top, and the pieces 15b are joined by a flexible wire 48 which is corresponding to the joint 18. The contacting surfaces 15a of the pieces 15b are formed in partial spherical surface. In the embodiment, each contacting surface 15a may be formed on a disket 49 made separate from the pieces 15b as seen in FIG. 14.

The articulating or flexible part 18 may be comprised of the whole of the float 15 made of flexible materials such as a plastic string, wires, cords 50, as seen in FIG. 16, or a plurality of slender plastic bars 51, as seen in FIG. 17.

It is apparently understood that the invention is not limited in the embodiments illustrated herein, but including many other modifications made from these embodiments within the course and the spirit of the invention implied in the claims.

I claim:

1. A valve with a level gauge for a liquefied gas container comprising:
   (a) a body adapted to be screwed in a threaded hole formed through an upper end of a vertically elongated container for containing liquefied carbon dioxide;

(b) a level guage combined with said body, wherein said level gauge comprises:
  (i) an indicator visible from outside of said body, said indicator comprising an indicating member, a hole for housing said indicating member such that said indicating member is movable within said hole, said hole extending vertically from an upper surface of said body, and preventive means for preventing misactuation of said indicating member;
  (ii) a rod having an upper and a lower part, wherein said upper part is slidable within said body, and said lower part extends into said container;
  (iii) a detecting member fixed to said upper end of said rod so as to drive said indicator by magnetic attraction therebetween,;
  (iv) a vertically elongated float inserted in said container wherein said float is movable within said container and connected to said lower part of said rod, and;
  (v) at least one joining means connected between said float and said lower part of said rod, said joining means allowing an inner periphery of said container to support part of the weight of said float wherein the bending moment acting on said rod, caused by the weight of said float, when said container is tilted or laid down, is cancelled.

2. A valve as recited in claim 1, wherein said means is a flexible part.

3. A valve as recited in claim 2, wherein said flexible part is comprised of a ring articulated with both said lower end of said rod and said upper end of said float.

4. A valve as recited in claim 2, wherein said float is divided into at least two pieces, and these pieces are joined by at least one flexible part.

5. A valve as recited in claim 2, wherein a plurality of said flexible parts are positioned along the length of said float.

6. A valve as recited in claim 2, wherein said rod is divided into at least two pieces and said pieces are joined by at least one flexible part.

7. A valve as recited in claim 2, wherein said flexible part is comprised of a universal joint with a cross member.

8. A valve as recited in claim 2, wherein said flexible part is comprised of a knuckle joint.

9. A valve as recited in claim 2, wherein said flexible part is comprised of a spring joint.

10. A valve as recited in claim 1, wherein said float is comprised of flexible materials.

11. A valve as recited in claim 1, wherein said preventive means comprises a spring.

12. A valve as recited in claim 1, wherein said body comprises an elongated filling pipe disposed in said container, having at least one port at a lower end, said port being directed to a side wall of said container opposite said rod.

13. A valve as recited in claim 1, wherein a balancing weight is provided at a lower end of said float.

14. A valve as recited in claim 1, wherein said float is provided with a buffer at a lower end of said float.

15. A valve recited in claim 1, wherein said indicator is removably attached to said body.

* * * * *